July 24, 1923.
A. B. McKINLEY
DUMP BODY
Filed June 7, 1922
1,462,814
2 Sheets-Sheet 2
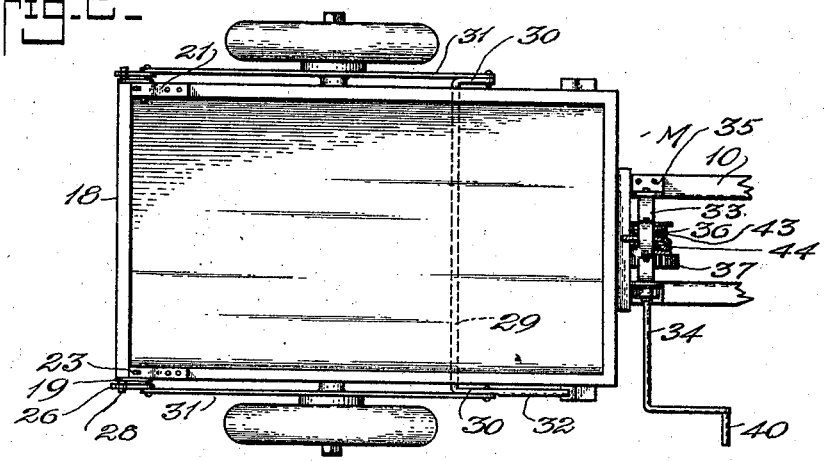
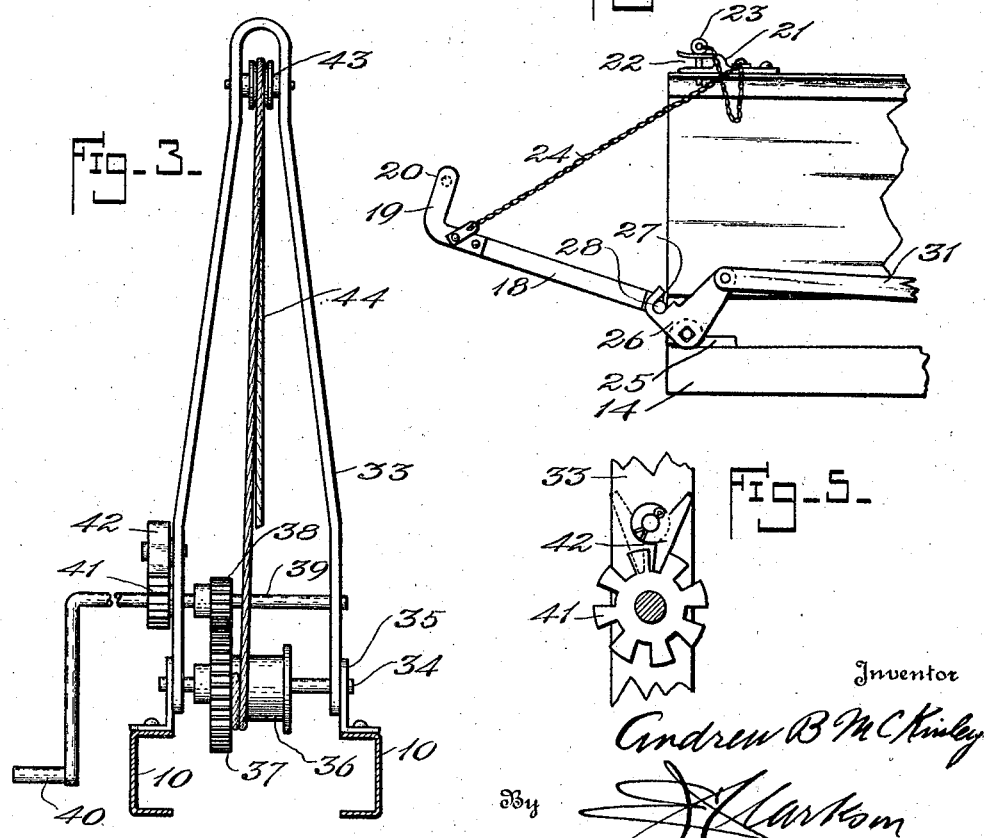

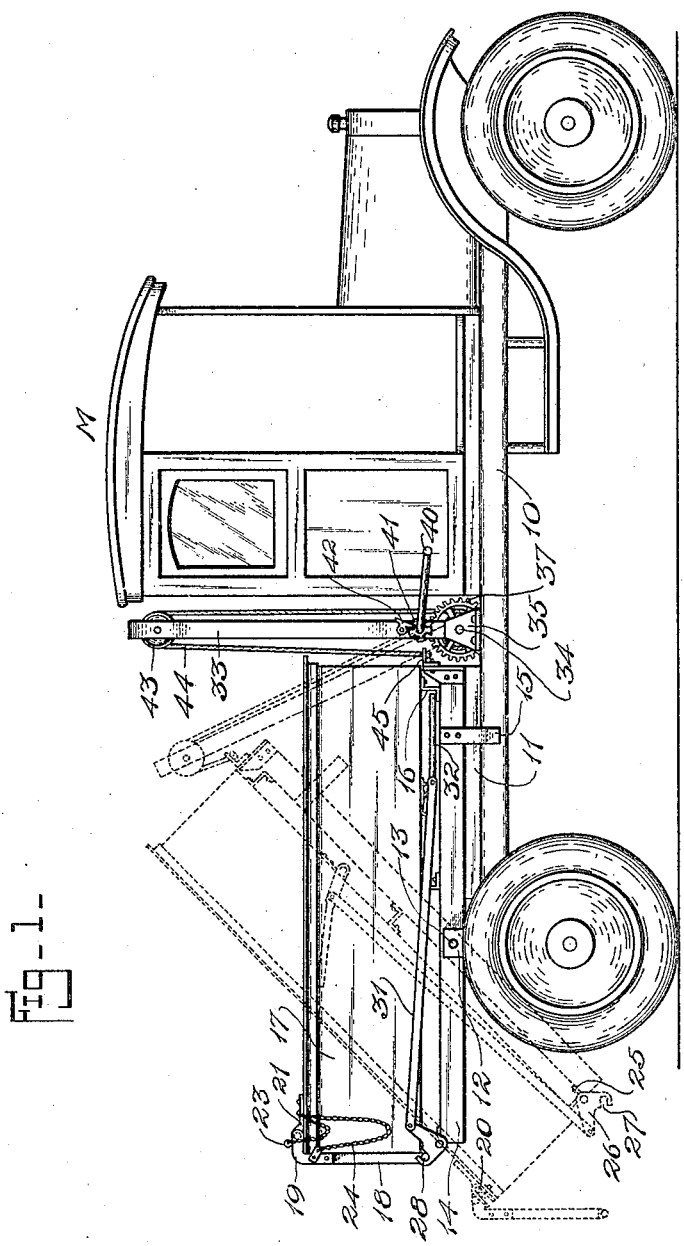

Patented July 24, 1923.

1,462,814

UNITED STATES PATENT OFFICE.

ANDREW B. McKINLEY, OF LOUISVILLE, KENTUCKY, ASSIGNOR TO CONTINENTAL CAR COMPANY OF AMERICA, A CORPORATION OF KENTUCKY.

DUMP BODY.

Application filed June 7, 1922. Serial No. 566,592.

*To all whom it may concern:*

Be it known that I, ANDREW B. McKINLEY, a citizen of the United States, residing at Louisville, in the county of Jefferson and State of Kentucky, have invented certain new and useful Improvements in Dump Bodies, of which the following is a specification.

This invention relates to vehicles and has special reference to a dumping body and mechanism for motor vehicles.

One important object of the invention is to improve the general construction of devices of this character.

A second important object of the invention is the provision of an improved tail gate and tail gate securing arrangement in connection with such a body.

A third important object of the invention is the provision of improved elevating means for the front end of such a body, the means being of such character as to be easily applied to the chassis of any ordinary motor vehicle.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of a motor vehicle showing the improved body applied thereto, the body being shown in transporting position in full lines and in dumping position in dotted lines.

Figure 2 is a plan view of the body in position on the vehicle.

Figure 3 is an enlarged view showing the body tilting mechanism from its front side.

Figure 4 is an enlarged side elevation of the rear of the body showing the tail gate dropped.

Figure 5 is a detail side view of a ratchet and pawl used herewith.

The invention, as illustrated in the drawings is shown as applied to the chassis of an ordinary motor vehicle M of the light delivery type and which has, as part of the chassis frame, a pair of longitudinally extending channels 10. On these channels are secured the sills 11 and just to the rear of the sills the channels carry the brackets 12 through which pass the pivot bolts 13. These bolts also pass through the longitudinal body bolsters 14 which are preferably channel iron and which, with the body in load carrying position, rest on the sills or frame bolsters 11. Projecting down from the sides of the body bolsters 14 are guide legs 15 which are positioned to straddle the channels 10 when transporting material so as to relieve the bolts 13 from stress due to lateral movement of the front end of the body by preventing such movement. On the body bolsters are supported the cross bars 16 which are preferably of Z-bars and which in turn support the steel body 17 open at the rear, the opening being closed when desired by the tail gate.

The tail gate 18 is provided at its upper corners with L-shaped brackets 19 from the forward ends of which project inwardly extending pins 20. On top of the body sides are mounted brackets 21 having rearwardly opening slots 22 in which said pins engage; the pins being retained in position by keeper pins 23 extending across said slots. The brackets 19 and 21 are also connected by chains 24 so that, when the pins 23 are removed, the gate 18 may drop down as in Figure 4. Pivoted at their angles to brackets 25 on the body bolsters are bell crank plates 26. One arm of each of these plates 26 normally extends in an upward direction and is provided with a forwardly opening slot 27 engaging a pin 28 projecting laterally from the lower corner of the tail gate. In this manner the lower edge of the tail gate is held shut but may be released, as shown in dotted lines in Figure 1, for dumping.

In order to effect this release on both sides simultaneously a rock shaft 29 is extended across the bottom of the body and is provided on each end with a rock arm 30 connected to a respective plate 26 by a link 31. One of the arms 30 is prolonged to form a handle 32 by means of which the rock shaft may be rotated and the plates moved to release the bottom of the tail gate. Thus the tail gate is arranged for pivoting at either its top or its bottom edge as may be selectively desired by the operator.

The dumping body is so provided that the forward end is heavier than the rear, and consequently tends to lie on the sills. To lift this front end there is provided a special hoist which, like the body, is adapted to be easily attached to a motor chassis.

This hoist consists of a frame made from a single piece of bar steel substantially of inverted V-shaped as at 33. This frame is pivoted on a shaft 34 supported by brackets 35 mounted on the frame channels 10. On the shaft 34 is a winding drum 36 and gear 37 which latter meshes with a gear 38 fixed upon a crank shaft 39 journalled in the frame 33 and provided with a handle 40. On this crank shaft is also fixed a double acting ratchet 41 controlled by a reversible pawl 42 so that danger from the dropping of the body may be prevented. At the top of the frame is an idler pulley 43. Around the drum 36 is wound a cable 44 which extends over the pulley 43 and has its free end connected to a bracket 45 secured to the forward ends of the body bolsters 14. With this construction the frame follows the movement of the front end of the body during the hoisting and lowering operations so that, not only is a more direct pull obtained with greater efficiency but bending stresses, such as would occur in a rigidly fixed frame, are eliminated.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:

1. In a vehicle, a body, a tail gate for said body, pivotal and releasable means for securing the upper part of the tail gate to the upper part of the body, and latches each comprising a single hook element arranged to constitute means for pivotally connecting the lower part of the tail gate to the body and for holding the same releasably against outwardly swinging movement.

2. In a vehicle, a body, a tail gate for said body having brackets secured to its upper side edges and provided with inwardly projecting pivot pins, brackets on the upper part of said body and having rearwardly opening slots receiving said pivot pins, keeper pins extending removably across said slots, pivot pins extending laterally from the lower sides of the tail gate, pivotally mounted latches having forwardly opening slots receiving the last mentioned pivot pins and movable to release the same, and means to control the position of said latches.

In testimony whereof, I affix my signature.

ANDREW B. McKINLEY.